Aug. 14, 1945.  E. E. WEMP  2,382,034
POWER TRANSMITTING APPARATUS
Filed April 30, 1942   6 Sheets-Sheet 1

Fig. 1

INVENTOR.
Ernest E. Wemp
BY
Barnes, Kisselle, Laughlin & Raisch
Attorneys

Aug. 14, 1945.   E. E. WEMP   2,382,034
POWER TRANSMITTING APPARATUS
Filed April 30, 1942   6 Sheets-Sheet 2

Fig. 2

Inventor
Ernest E. Wemp
By
Barnes, Kisselle, Laughlin & Raisch
Attorneys.

Aug. 14, 1945.   E. E. WEMP   2,382,034
POWER TRANSMITTING APPARATUS
Filed April 30, 1942   6 Sheets-Sheet 6

INVENTOR.
Ernest E. Wemp
BY
Barnes, Kisselle, Laughlin & Raisch
Attorneys.

Patented Aug. 14, 1945

2,382,034

UNITED STATES PATENT OFFICE 2,382,034

POWER TRANSMITTING APPARATUS

Ernest E. Wemp, Detroit, Mich.

Application April 30, 1942, Serial No. 441,183

6 Claims. (Cl. 60—54)

This invention relates to a power transmitting apparatus for the transmission of torque from a driving member to a driven member. More specifically, the invention relates to such an apparatus where the coupling for the transmission of torque is through the means of a fluid, although actually a liquid is required, such as water or oil or the like, and thus may be said to be hydraulic.

The invention aims to provide a torque converter wherein the ratio between the R. P. M. of the driving member and the R. P. M. of the driven member is variable. In carrying out the invention a hydraulic coupling is provided having a torus chamber in which the liquid is caused to circulate and a driving impeller member, a stator member and a driven turbine member having blades positioned in the torus chamber for establishing the coupling.

One object of the invention is to provide an efficiently operating mechanism which requires a minimum amount of power to circulate the liquid through the torus chamber. To this end the torus chamber is preferably somewhat elongated in cross-section having end parts which turn the liquid through 180° and the end sections are divided by one or more partitions forming separate passages which receive the liquid axially, guide the liquid through the 180° turn and discharge the liquid axially. These partitions also increase the ratio between the mean radius of the passages and the width of the passages to within a range which provides substantially a minimum of loss of power in moving the liquid through the bend.

The principal object of the invention is to provide for the variation of the R. P. M. of the driving impeller member relative to the R. P. M. of the driven turbine member by the adjustment of the blades on one of the members, such as the driven turbine, through an appropriate angle. But it is necessary, in order to have the best and most efficient operation, that the liquid enter all of the blades without shock and since the point of entry at one set of blades is preceded by an exit from another set of blades, the manner of exit is as important as the manner of entrance. Accordingly, a coordinated blade set is provided wherein, as regards the impeller member and the turbine member, the blades of one are fixed and determined by the speed conditions under which the other member having the adjustable blades is designed to operate to provide for substantially shockless entry and proper exit of the liquid relative to the blades of both members in the two extreme positions of adjustment of the adjustable blades and for a minimum of shock in the intermediate positions of adjustment. More specifically, the blades of the impeller are determined and the blades of the turbine are adjustable.

In a construction for carrying out the invention a torus chamber having some axial extent with ends for changing the direction of the liquid through 180° is provided. The impeller blades, the stator blades and the turbine blades are disposed in an axial portion of the torus chamber. The impeller blades, which are the blades which cause the flow of the liquid through the torus chamber, are fixed and determined as to their angularity and change the absolute velocity of the liquid; the stator blades are determined and fixed as to their angularity for receiving the liquid from the impeller without shock and the stator blades do not change the absolute velocity of the liquid; the turbine blades are adjustable as to their angularity and receive the liquid from the stator substantially without shock in their two extreme positions of adjustment and discharge the liquid in a substantially proper axial direction so that the liquid, after passing through the remainder of the torus chamber, enters the impeller blades substantially without shock. In the intermediate positions of adjustment of the turbine blades some error is encountered but the error is minimized and the shock is accordingly minimized.

I have discovered that through the means of a master diagram all the necessary information can be ascertained for the construction of such a coordinated blade set from a theoretical standpoint. Such a diagram, as is explained below, as regards the impeller will give the entrance and exit angles, the relative and absolute velocities; as regards the stator will give the absolute velocity angle and the absolute velocity; as regards the turbine in its two extreme positions of adjustment the master diagram will give the entrance and exit angles and the relative and absolute velocities. However, there are losses tending to retard the flow of the liquid and in order to overcome these losses the impeller blades are constructed to compensate for the losses and maintain the theoretical axial velocity of the liquid in the torus chamber. This, of course, will have to be obtained empirically or experimentally as it depends upon the resistance encountered.

One construction for carrying out the invention is disclosed in the accompanying drawings.

Figure 1:
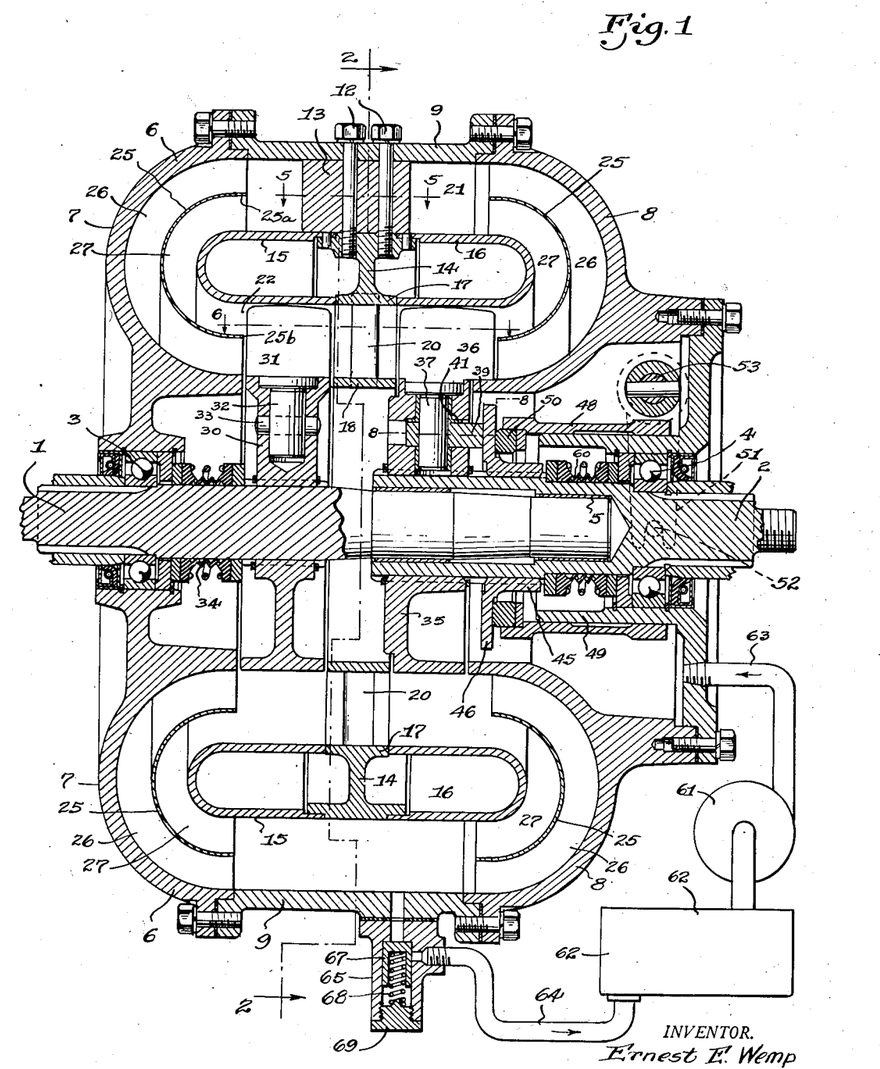
Fig. 1 is a cross-sectional view through a torque converter constructed in accordance with the invention showing the axially elongated nature of the torus chamber and the position of the impeller, stator and turbine.

In Fig. 1, a drive shaft is illustrated at 1, to which power may be transmitted by any suitable prime mover such, for example, as an internal combustion engine, and a driven member is shown at 2. The driving member is journalled as at 3 in a suitable casing while the driven member is journalled as at 4 and the two members may telescope together with the interposed bearings 5.

Figure 2:
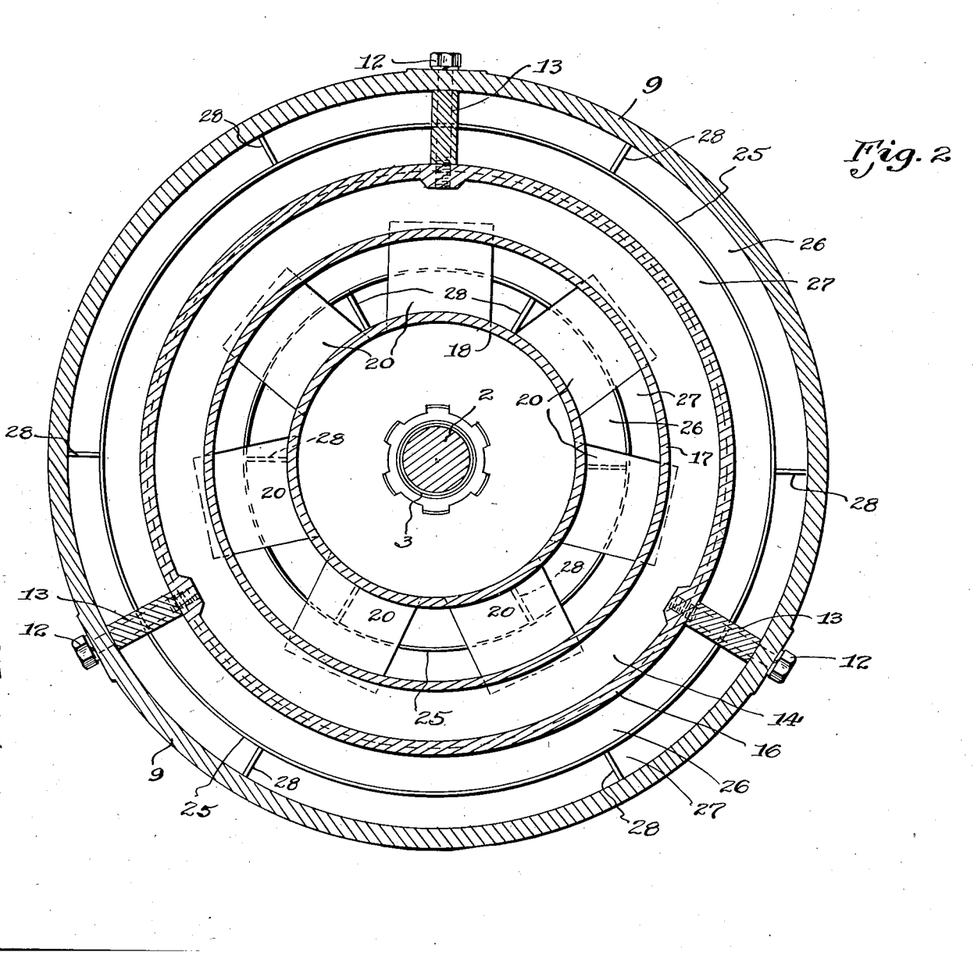
Fig. 2 is a cross-sectional view taken on the line 2—2 of Fig. 1, showing the stator and torus chamber.
Figures 4, 5, 6, 8:
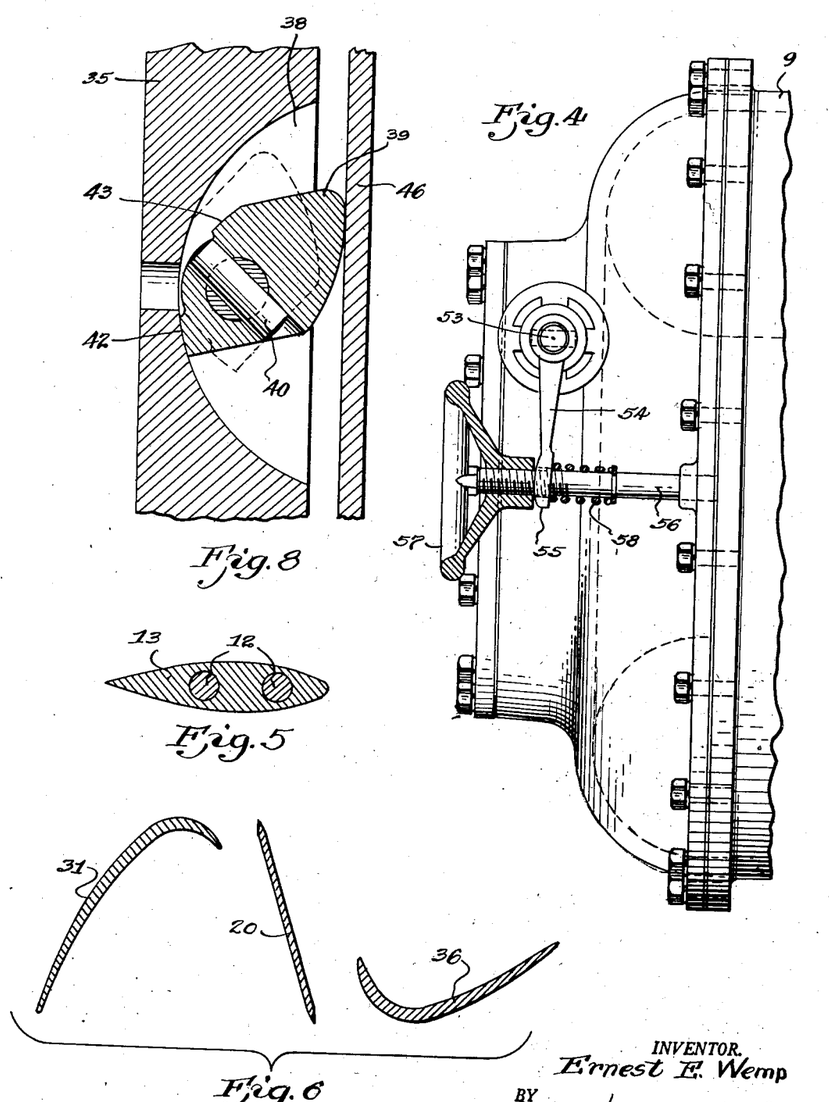
Fig. 4 is a partial side elevation showing the adjusting mechanism.
Fig. 5 is a sectional view taken on the line 5—5 of Fig. 1, showing a supporting strut.
Fig. 6 is a sectional view taken substantially on line 6—6 of Fig. 1, illustrating, somewhat diagrammatically, the relation of the impeller, stator and turbine blades.
Fig. 8 is a sectional view taken substantially on line 8—8 of Fig. 1, showing the adjusting cam for a turbine blade.

The casing, generally indicated at 6, provides the torus chamber, the casing having a member 7, another member 8, which essentially provide the return bend portions of the torus chamber, and an intermediate member 9, all of which are suitably connected as shown. The intermediate member supports the core or inner portion of the torus chamber and the stator blades. Cap screws 12 extend through struts 13 which may be of streamline form, as shown in Fig. 5 for carrying the stator body, generally indicated at 14 and the inner core members of the torus chamber, as shown at 15 and 16 are secured to the stator. The stator includes a wall section 17 which lines up with the inner core wall and a wall section 18 which lines up with an outer wall of the torus chamber and between the sections 17 and 18 has the stator blades 20. The number of blades may be varied but, as shown in Fig. 2, there are seven blades in the structure shown. These blades are angularly disposed, as shown in Fig. 6.

It will be seen that this structure forms a torus chamber somewhat elongated in axial direction having an outer axially extending portion 21, an inner axially extending portion 22 and end portions which are curved to change the direction of the liquid flow through 180°. These curved end sections are partitioned to provide separate passages or channels and in the form shown there is one partition 25 forming two channels 26 and 27. The partitions may be supported as shown in Fig. 2 by strut members 28. This partition or nest structure preferably extends beyond the radius of the ends and into the axially extending portions so as to completely turn the liquid and discharge it axially and to receive the liquid axially.

The nest or partition structure at the ends of the torus chamber reduces the power required to circulate the liquid. The elements 28 serve to divide the torus chamber circumferentially, as shown in Fig. 2, where it will be noted that there are six of such division members. These serve to straighten out the flow of the liquid into a true axial direction.

The power losses in the movement of a liquid through a right angle elbow is proportional to the ratio of the radius to the diameter of the conduit which, as applied to the torus chamber, is the ratio between the radius and the width of the channel. In the structure shown in Fig. 1, for example, the ratio between the radius and the width of the torus chamber at the ends of the torus chamber is about 1:1, whereas a ratio of about 2.75:1 provides the least resistance although a ratio within the range of from about 1.7:1 to about 3.5:1 may be considered good. By the use of a partition 25, two channels are formed. The result of this is that the mean radius for the outer channel 26 is increased while the width of the channel is cut in half, without considering the thickness of the stock forming the partition. In the structure shown, this gives a ratio of about 2.6:1 which represents approximately the most desirable condition. The width of the inner channel 27 is also cut approximately to half of the entire width of the torus chamber and while the mean radius of the channel 27 is less than the mean radius of the entire torus cross-section, the ratio is increased because the radius has only been reduced one-fourth, thus leaving a ratio of about 1.55:1 which is a very desirable condition. Of course, each end of the torus chamber, in effect, comprises two right angular turns. Where the ratio is 1:1 tests have shown that the power loss, as represented by the coefficient K, to be about .37 as against K .13 for a ratio of about 2.6:1, and K .24 for a ratio of about 1.5:1.

Moreover, the partitions 25 are extended at their ends sufficiently far so as to receive the liquid from and discharge the liquid axially into the portions 21 and 22 to minimize turbulence. The ends of the partitions are not centralized relative to the axially extending portions but are positioned preferably to divide the axial portions into equal areas. For example, the end 25a is positioned nearer the outer wall of the torus chamber than the inner so that by reason of the varying radii the cross-sectional area at the opening of the channel 26 is equal to that at the opening of channel 27. Similarly, the inner end 25b is positioned closer to the core wall so that the area at the channel openings into the inner axial portion of the torus chambers are substantially equal. It is to be understood that more than one dividing partition such as partition 25 can be employed to divide the ends into more than two channels.

The impeller and the turbine are secured respectively to the driving member and the driven member and have blades situated in the inner axial portion of the torus chamber. Accordingly, the impeller 30 is secured to the shaft 1 and it has blades 31 projecting into the torus chamber. These blades may have posts 32 pinned to the member 30 as at 33. A suitable seal structure, generally indicated at 34, seals the housing or casing at the location of the bearing 3.

The turbine has a body member or carrier 35 secured to the driven member 2 and its blades are angularly adjustable. To this end each blade 26 has a trunnion 37 journalled in the carrier 35, preferably through the means of suitable bearings. Non-rotatably affixed to each trunnion and located in a suitable cavity 38 of the carrier is a cam 39 (Figs. 2 and 8). Each cam may be pinned to the trunnion as at 40 and a thrust bearing 41 may be positioned between the outer part of the cam and the carrier 35. Therefore, rotation of the cam causes rotation of the blade 36 on its trunnion 37 and its angularity is thus adjustable. Each cam has faces 42 and 43 which abut the carrier and limit the rotational movement of the cam.

Figure 3:
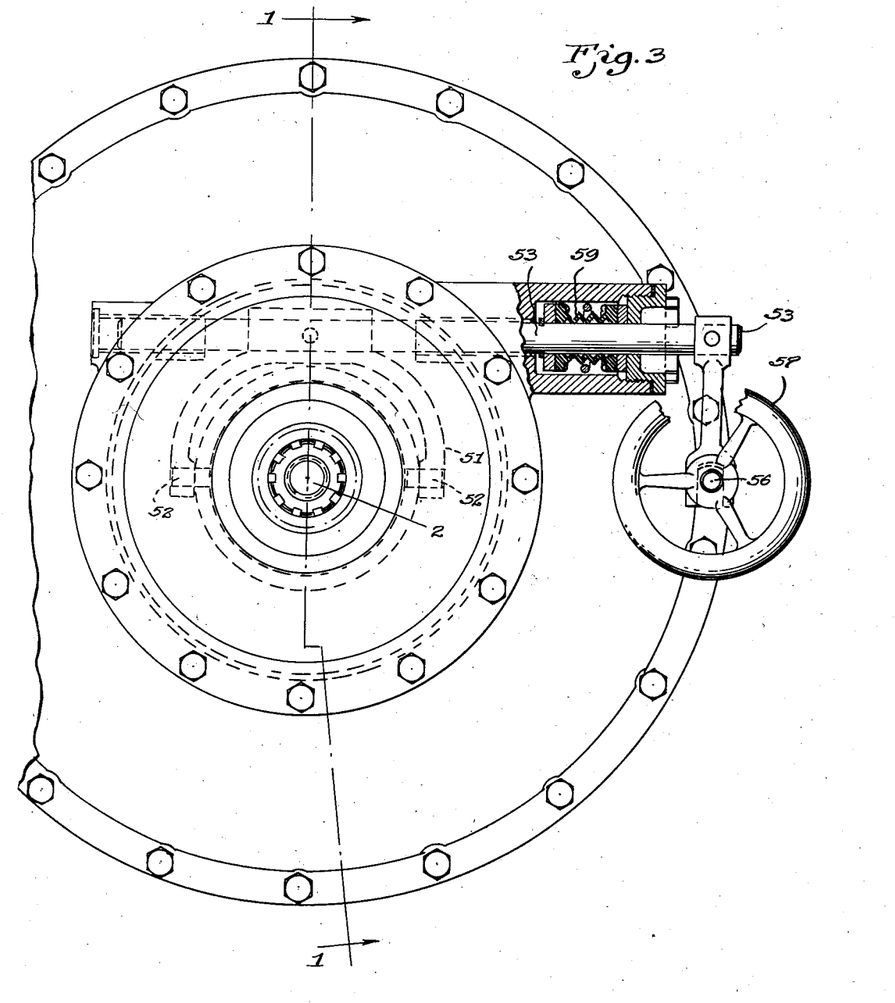
Fig. 3 is an end view illustrating some of the means for adjusting the turbine blades.
Figure 7:
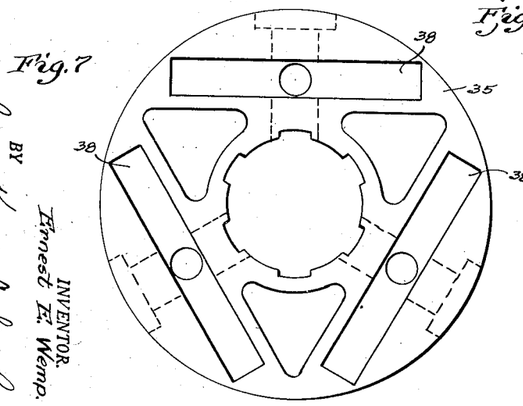
Fig. 7 is an elevational view of the turbine blade carrier.

The means for controlling and operating the cams takes the form of a member or sleeve 45 slidably keyed or splined to the driven member 2 and having a flange 46 which engages the cams, as shown in Fig. 8. As illustrated, there are three turbine blades (see Fig. 7) and similarly there may be three blades on the impeller. A sleeve member 48 is slidably arranged on an extension 49 of the housing and it is arranged to engage the flange 46 through the means of a suitable friction bearing 50. Any suitable means may be employed to shift the sleeve 48 and the example shown resides in a yoke 51 (Fig. 3) the ends of which are connected to the sleeve by pins or the like 52 and the yoke is non-rotatably mounted upon a rock shaft 53. This rock shaft extends out through the housing and carries an arm 54 having a clevis portion 55 riding over a screw-threaded post 56. A hand wheel 57 may be turned to swing the arm 54 and a spring 58 backs up the arm 54 and causes it to follow the hand wheel. The housing chamber may be sealed at the rock shaft 53 by a suitable sealing element 59 and the housing may be sealed at the journal for the driven shaft 2 by a suitable sealing structure 60.

The entire housing structure is filled with liquid and for cooling purposes the liquid may be caused to circulate through the housing and a cooler. To this end an exterior circuit, diagrammatically shown, is provided, including a pump 61 and a cooler 62 for pumping the liquid into the housing through the conduit 63. The outlet for the liquid into the conduit 64 preferably includes a pressure relief valve which embodies a casing 65 attached to the housing member 9 and in which is a spring pressed relief valve 67. The tension of the spring 68 can be adjusted by a screw threaded nut 69. Thus the pump works against the relief valve and the relief valve may be set to maintain the desired pressure on the liquid in the housing.

Figure 9:
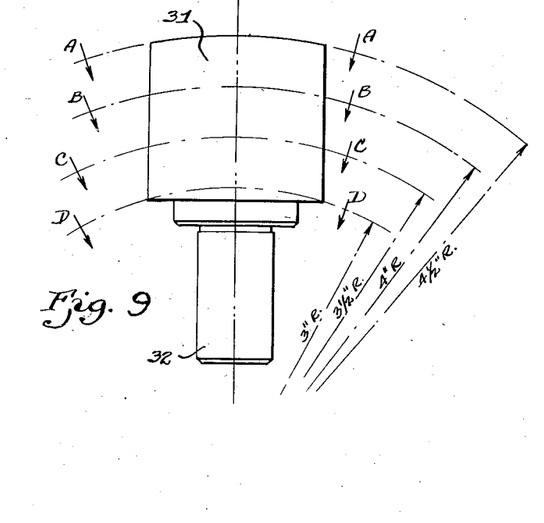
Fig. 9 is a view showing a blade of the impeller.
Figure 10:
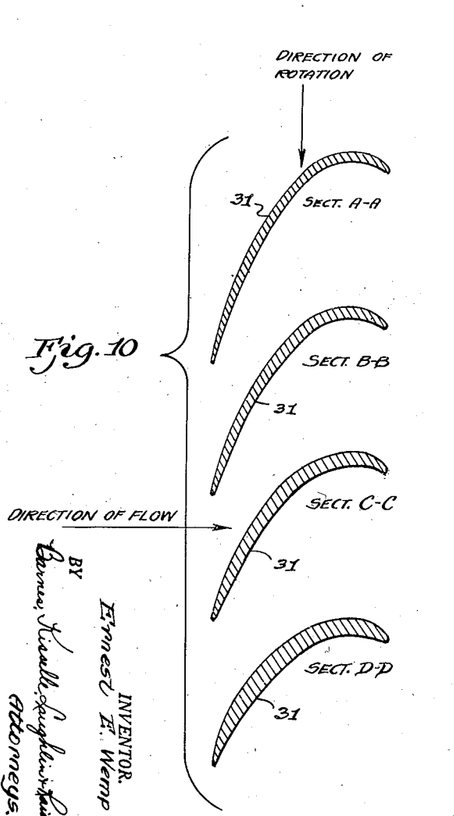
Fig. 10 is a bracketed view showing four sections taken on the corresponding section lines of Fig. 9, illustrating the varying formation of the blade in radially different positions.
Figure 11:
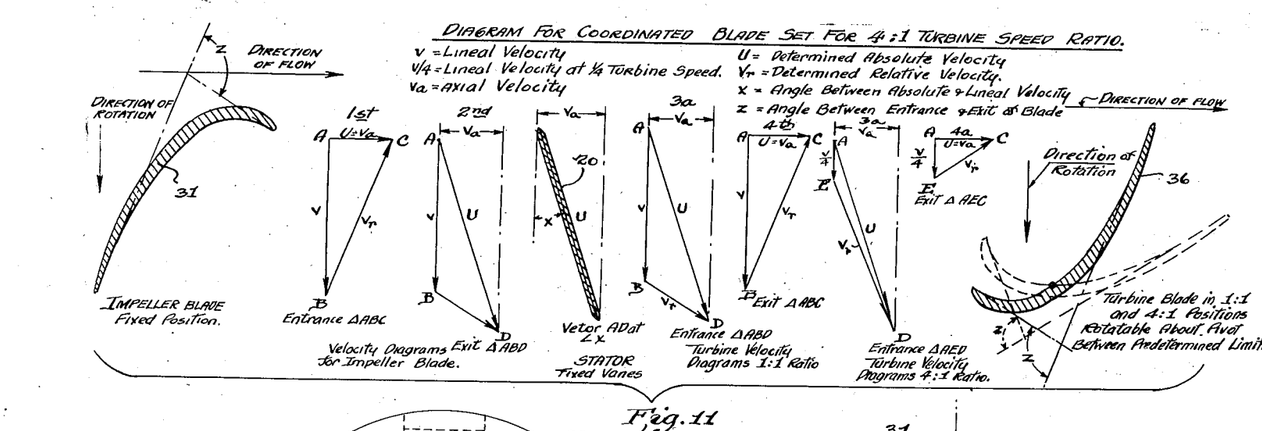
Fig. 11 is a bracketed view illustrating a sequence of diagrams and the impeller, stator and turbine blades.

In the operation of the unit the liquid is caused to circulate by the impeller through the torus chamber in a counterclockwise direction as the upper half of Fig. 1 is viewed. Also the liquid has a lineal velocity around the center of the axis of rotation. The angularity and form of the impeller blades are accordingly a controlling factor. The blades of the impeller and the turbine, as well also as the blades of the stator, are so coordinated that the liquid is received and discharged from each blade without substantial shock or with a minimum of shock when the turbine blades are in an intermediate position of adjustment, and the angular adjustment of the turbine blades results in a variation of the relative R. P. M. between the impeller and the turbine. The impeller blades are also preferably constructed to uniformly accelerate the liquid; the turbine blades are preferably formed to uniformly decelerate the liquid at the position of adjustment of greatest use. For example, if the predominating use is that of a 1:1 ratio the turbine blades will be constructed preferably to uniformly decelerate the liquid when adjusted to the 1:1 ratio position. Inasmuch as the blades extend radially, their form and curvature will vary with the radius as indicated in Figs. 9 and 10. Also, the arrangement for the turbine blades is such that the forces of the liquid thereon are unbalanced so as to tend to rotate the turbine blades on their pintles in a direction which causes the cams 39 to follow the flange 46. In other words, the pressure on each turbine blade tends to swing the blade clockwise as the turbine blade in Fig. 11 is viewed. Thus by manipulating the control to shift the sleeve 48 to the left, the blades are forcefully adjusted angularly and when the adjustment retracts the sleeve 48 to the right, unbalanced pressure on the blades causes the cams to follow the flange 46.

Figure 12:
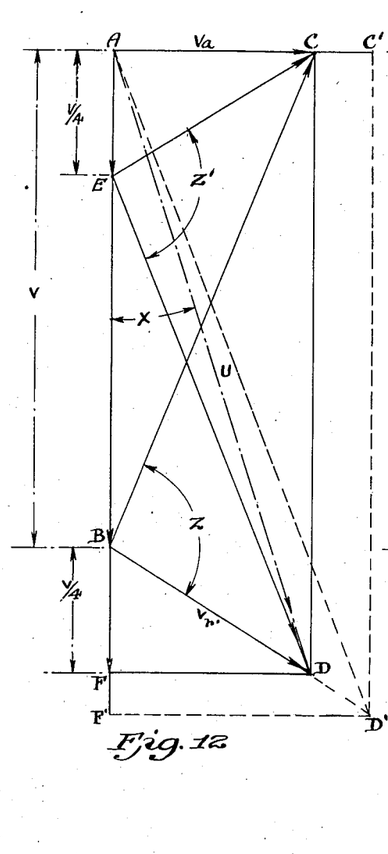
Fig. 12 shows a master diagram from which the information for the construction of a co-ordinated blade set having variable ratio of from 1:1 to 4:1 may be had and also illustrating the variation of the angularity of the impeller blade from the theoretical angle to take care of frictional losses, etc.
Figure 13:
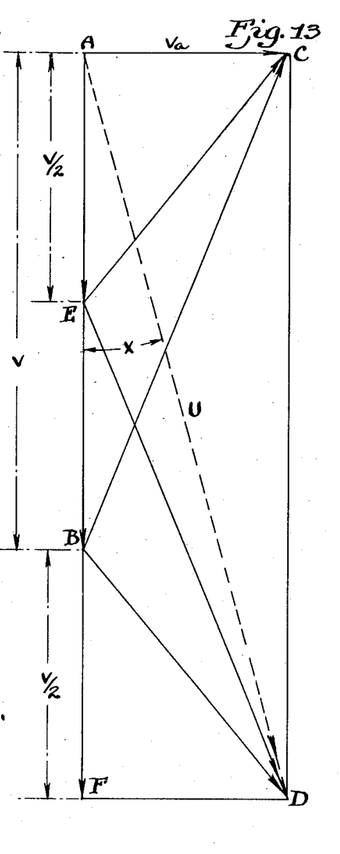
Fig. 13 is a view similar to Fig. 12 illustrating a master diagram for a coordinated blade set having a variable ratio of from 1:1 to 2:1.

In the construction of such a coordinated blade set, all the necessary information can be obtained from a master diagram, as shown in Figs. 12 and 13. First, however, consider the bracketed view (Fig. 11) wherein several vectorial diagrams are shown together with the impeller, stator and turbine blades. The first vectorial diagram is a velocity diagram at the entrance of the impeller blades. $Va$ is the axial velocity of the liquid, $U$ is the determined absolute velocity, $V$ is the lineal velocity, while $Vr$ is the determined relative velocity. The second diagram is the exit diagram for the impeller blades. It will be noted that the stator blade angle is the same as the absolute velocity so that the liquid enters and leaves the stator blades without change in the absolute velocity with the result that the third diagram is the same as the second. The third diagram is that of the entrance into the turbine blades, while the fourth diagram is that at the exit of the turbine blades when adjusted for the 1:1 ratio. It will be seen that the absolute velocity of the liquid has been changed so that it again coincides with the axial and that the fourth diagram is the same as the same as the first diagram and the liquid has been changed back to its original condition. The third and fourth diagrams are those at the entrance and exit of the turbine blades when the turbine blades are adjusted to the full-line position shown in Fig. 11. Under these conditions the turbine blades are just the opposite of the impeller blades. In the present setup, as shown, the turbine blades are adjustable to the dotted-line position shown in Fig. 11 and in this position the ratio of the R. P. M. of the impeller to the R. P. M. of the turbine is 4:1. The entrance and exit diagrams for this adjustment is shown at $3a$ and $4a$ where it will be noted that the lineal velocity is one-fourth of that in the first diagram, the absolute velocity is the same as the third diagram but the relative $Vr$ is different because the relative is the algebraic sum of the lineal and absolute velocities. However, at the exit of the turbine blades the absolute velocity has been turned through an angle so that it again coincides with the axial as shown in diagram 4a.

The master diagram in Fig. 12 is for a blade set which is variable from 1:1 ratio to 4:1 ratio. The construction of the master diagram may be as follows:

Layout $AB=V=$ given lineal velocity
Layout $AC=Va=$ given axial velocity

Layout $AE=\frac{V}{4}=$ given lineal velocity at low ratio limit

Layout $BF=AE=\frac{V}{4}$

Draw CD parallel to AF
Draw FD parallel to AC to complete the parallelogram AFDC
Connect AD, EC, ED, BC and BD It will be seen that:

Triangle $CAE=$ triangle $DFB$
Triangle $CAB=$ triangle $DFE$
Therefore, triangle $CEB=$ triangle $DBE$
And triangle $CED=$ triangle $DBC$
Therefore, angle $EBD=$ angle $BEC$
And angle $CEB=$ angle $DBE$
And angle $CED=$ angle $DBC$ In regard to the impeller, in vector triangle ABC, $BC=AB$ plus $AC=Vr$ relative velocity of AB and AC. This is the relative velocity at the entrance of the impeller blades and triangle ABC corresponds to the first diagram of Fig. 11. An absolute velocity of AD is necessary in the turbine blade design to give shockless entrance and axial flow exit in the two extreme turbine blade positions. Accordingly, in vector triangle ABD, $BD=AB$ plus $AD=Vr$ relative velocity of AB and AD, and triangle ABD is the proper velocity diagram at the impeller outlet and corresponds to the second diagram in Fig. 11.

Thus far the diagram satisfies theoretical conditions, it being assumed that the axial velocity $Va$ is the actual axial velocity of torus flow. This velocity is initiated and maintained by the impeller blades. Since in practice there will be friction, viscosity of the liquid, and turbulence tending to retard the axial velocity, it is necessary to correct the impeller blade construction to offset these losses. In making this necessary correction, the entrance velocity diagram, triangle ABC, is correct since the lineal velocity V is actual and it is assumed the absolute velocity and axial velocity have a value of $Va$ at the entrance to the impeller blade.

There must be a pressure head difference between the axial velocity just before entering the impeller blades and the axial velocity at the exit of the impeller blades if the velocity $Va$ is to be maintained and losses overcome. These losses, due to friction, viscosity, turbulence, etc., can best be determined experimentally. The losses may be represented by the actual axial velocity observed as against theoretical axial velocity. Tests have shown that the ratio of actual to theoretical axial velocity is substantially constant over wide speed ranges. Therefore, the losses may be compensated for in the construction of the impeller blade to the end that an actual axial velocity of $Va$ to lineal velocity $V$ may be maintained.

One method of constructing the master diagram to show the required compensation in the impeller blades is illustrated in Fig. 12 where, in conjunction with the theoretical master diagram, the following is added:

Make $$AC'=AC\times\frac{\text{theoretical axial velocity}}{\text{observed axial velocity}}$$

Complete rectangle AC'D'F'
Connect A and D'
$AB=$ lineal velocity
$AC'=$ axial velocity
$AD'=$ absolute velocity
$BD'=$ relative velocity Since the pressure head varies as the square of the velocity:

Let $H=$ head at velocity $AC'$
Let $H'=$ head at velocity $AC$ $$H-H'=\frac{(AC')^2}{2g}-\frac{(AC)^2}{2g} \text{ or}$$

$$H-H'=\frac{(CC')^2}{2g}$$

$H-H'$ is the necessary head to overcome losses and maintain actual axial velocity AC or $Va$ and, due to the losses, the absolute velocity is reduced from AD' to AD and the axial velocity from AC' to AC at the exit of the impeller blades. Therefore, in constructing the impeller blades they will be formed to give an axial theoretical velocity of AC' which, however, actually becomes AC because of the losses in the system.

As regards the stator, X is the angle between the absolute velocity AD and the lineal velocity AB. Since there is to be no change in velocity through the stator, the vector AD at angle X is the proper angle for the stator blade.

Now considering the turbine with the blades adjusted for a 1:1 speed ratio, as shown in full lines in Fig. 11; in triangle ABD, $BD=AB$ plus $AD=$ relative velocity of AB and AD. Therefore, triangle ABD is the proper entrance velocity diagram for the turbine at a 1:1 ratio. In triangle ABC, $BC=AB$ plus $AC=$ relative velocity between AB and AD. Therefore, triangle ABC is the proper exit velocity diagram to make the absolute velocity equal to the axial velocity.

Considering now the turbine when adjusted for a speed ratio of 4:1; in triangle AED, $ED=AE$ plus $AD=$ relative velocity of AE and AD. Therefore, triangle AED is the proper velocity diagram for sockless entry into the turbine when the blades are adjusted to the 4:1 ratio, as shown by the dotted lines in Fig. 11. In triangle AEC, $EC=AE$ plus $AC=$ relative velocity $Vr$ of AE and AC. Therefore, triangle AEC is the proper velocity diagram if the absolute velocity is to equal axial velocity at the exit of the turbine.

The angle Z between the entrance and the exit of the turbine blades in the 1:1 ratio position is angle DBC. The angle Z' between the entrance and the exit of the turbine blades at the 4:1 ratio position is the angle CED. But angle $DBC=$ angle $CED$. Therefore, the turbine blade may be pivoted to move through the angle BDE for proper entry of the liquid thereto in both the extreme positions of adjustment, while the exit will move through angle BCE and angle $BDE=$ angle $BCE$ (from the equal triangles CEB and DBE). Therefore, both entrance and exit of the turbine blade will be correct for either of the two extreme positions of adjustment. In the master diagram it will be noted that BF was made equal to AE or $$\frac{V}{4}$$

and that the necessary absolute velocity U at the impeller exit was thus determined. This is done in order to obtain the necessary equality of triangles and angles so that the turbine blade may be pivoted and moved between predetermined limits and still provide for substantial shockless entry and axial discharge in both extreme positions of adjustment. The shape of the impeller blade is thus determined by the speed conditions under which the turbine is designed to operate and this gives rise to the term used herein, namely, "coordinated blade set."

In considering the master diagram, Fig. 13, for a blade set which is variable from 1:1 to 2:1, AE is laid out equal to one-half of AB and BF laid out to equal AE. Otherwise, the diagram corresponds to that shown in Fig. 12. The diagram at the impeller outlet is the triangle ABD and the angle ABD of Fig. 13 is greater than the angle ABD of Fig. 12 for the 4:1 ratio set. Also, the angle of turning of the turbine blade is the angle BDE or BCE which is less than the corresponding angle for the 4:1 ratio set, as shown in Fig. 12. The correction for losses in the system is not shown in Fig. 13.

Thus, the diagram of the impeller, stator and turbine and the angle through which the turbine blades are adjustable must be coordinated to the conditions set up in the diagram. The master diagram gives all the following information; as to the impeller it gives the entrance and exit angles and the relative and absolute velocities; as to the stator it gives the absolute velocity angle and the absolute velocity; as to the turbine with the blades positioned for the upper limit or 1:1 ratio it gives the entrance and exit angles and the relative and absolute velocities and with the blades positioned in the lower limit, that is, at 4:1 ratio or 2:1 ratio or any other selected ratio for the lower limit it gives the entrance and exit angles and the relative and absolute velocities. The master diagram also gives the angle through which the turbine blade must be adjusted from the upper limit, say for example, the 1:1 ratio to the lower limit, for example, the 4:1 ratio position or any other selected lower ratio position.

It is to be understood that by constructing the blades in accordance with the master diagram, substantially shockless entry of the liquid into the impeller blades and turbine blades is accomplished in the two extreme positions of adjustment of the turbine blades. The turbine blades discharge the liquid axially, and this liquid is received by the impeller blades substantially without shock, and after the impeller blades have changed the absolute velocity, the liquid is received by the turbine blades substantially without shock. From an elementary standpoint the entrance and exit tips of the blades parallel the relative velocity Vr demonstrated in the master diagram. However, some error will be encountered in the intermediate positions of adjustment of the turbine blades which will result in a condition of shock. This error, however, is minimized with the greatest error lying substantially midway between the two extreme positions of adjustment of the turbine blades and gradually decreases from the midway position toward the extreme positions of adjustment.

It is to be understood that in the operation of the device the angular momentum of the liquid is changed as it passes through the impeller thereby storing energy in the liquid due to change in the magnitude and direction of the absolute velocity of the liquid. This requires expenditure of torque in the prime mover. The stored energy in the liquid is expended on the turbine blades in changing the angular momentum (negatively) as the absolute velocity is again changed both in magnitude and direction as the liquid passes through the turbine blades. This results in a turning moment or torque being delivered to the driven member. The magnitude of the torque is determined theoretically by the inverse ratio of the impeller speed to the turbine speed.

Tests have shown that with a determined contour of the impeller blades the ratio of observed axial velocity of the liquid to lineal velocity of the blade, at any selected radius, is substantially constant over wide speed ranges, or in other words, the axial velocity of liquid flow is substantially a linear function of the lineal velocity. This condition is essential for effective operation of the machine over wide speed ranges. The high and low ratio positions of the turbine blades are those positions which are theoretically correct and provide for maximum efficiency when the device is actually operating at the speed ratio (high or low) for which the blades are set. The high and low ratio positions of the adjustable blades may, therefore, be termed the "effective" ratio positions.

The construction of the torque converter disclosed herein, as will be appreciated by reference to Fig. 1, shows the impeller directly connected to the driving member and the turbine directly connected to the driven member, but the arrangement can be employed in combination with an epicyclic gear set for the transmission of torque. The epicyclic gear set may have, for example, as is well known to those versed in the art, an outer ring gear member, an inner sun gear member and a third member which serves as a carrier for planetary pinions whose teeth mesh with those of the outer ring gear member and with the sun gear member. In the combination of the present construction with such an epicyclic gear set the impeller will be connected for rotation in unison with, for example, the carrier for the planetary pinions; the turbine will be connected for rotation in unison with, for example, the ring gear, while the driven shaft or final driven member will be connected, for example, to rotate in unison with the sun gear. In this way variation in the R. P. M. of the turbine and therefore the ring gear will result in varying the ratio between the R. P. M. of the driving impeller and carrier and the R. P. M. of the sun gear and final driven member.

What I claim is:

1. In a hydraulic coupling, a driving member, a driven member, means forming a torus chamber surrounding the axis of the members adapted to be filled with liquid, an impeller on the driving member having blades operating in the torus chamber, said blades being predetermined to cause the liquid to flow through the torus chamber at a given axial and a given lineal velocity, a stator having fixed blades in the torus chamber for receiving the liquid from the impeller and which are disposed substantially parallel to the absolute velocity of the liquid as discharged from the impeller blades, a turbine on the driven member having blades for receiving the liquid from the stator, means pivotally adjusting the turbine blades, each on a substantially radial axis, through a predetermined angle to provide a high R. P. M. ratio between the impeller and the turbine in one extreme position of blade adjustment and a low ratio in the other extreme position of blade adjustment, the turbine blades being constructed to receive the liquid from the stator, at the absolute velocity as determined by the impeller, substantially without shock in both extreme positions of adjustment and to discharge the liquid in both extreme positions of adjustment with an absolute velocity for the reception of the liquid at the entrance of the impeller blades substantially without shock.

2. In a hydraulic coupling, a driving member, a driven member, means forming a torus chamber surrounding the axis of the members adapted to be filled with liquid, an impeller on the driving member having blades operating in the torus chamber, said blades being predetermined to cause the liquid to flow through the torus chamber at a given axial and a given lineal velocity at a given R. P. M., a stator having fixed blades in the torus chamber for receiving the liquid from the impeller and which are disposed substantially parallel to the absolute velocity of the liquid as discharged from the impeller blades, a turbine on the driven member having blades for receiving the liquid from the stator, means pivotally adjusting the turbine blades, each on a substantially radial axis, through a predetermined angle to provide an effective high R. P. M. ratio between the impeller and the turbine in one extreme position of blade adjustment and an effective low ratio in the other extreme position of blade adjustment, the turbine blades being constructed to receive the liquid from the stator at the absolute velocity as determined by the impeller substantially without shock in both extreme positions of adjustment and to discharge the liquid in both extreme positions of adjustment, with an absolute velocity for the reception of the liquid at the entrance of the impeller blades substantially without shock, the impeller blades being constructed to substantially uniformly accelerate the liquid and the turbine blades being constructed to substantially uniformly decelerate the liquid in one of the two extreme positions of adjustment.

3. In a hydraulic coupling, a driving member, a driven member, means forming a torus chamber surrounding the axis of the members adapted to be filled with liquid, an impeller on the driving member having blades operating in the torus chamber, said blades being predetermined to cause the liquid to flow through the torus chamber at a given axial and a given lineal velocity at a given R. P. M., a stator having fixed blades in the torus chamber for receiving the liquid from the impeller and which are disposed substantially parallel to the absolute velocity of the liquid as discharged from the impeller blades, a turbine on the driven member having blades for receiving the liquid from the stator, means pivotally adjusting the turbine blades, each on a substantially radial axis, through a predetermined angle to provide a high R. P. M. ratio between the impeller and the turbine in one extreme position of blade adjustment and a low ratio in the other extreme position of blade adjustment, the turbine blades being constructed to receive the liquid from the stator at an absolute velocity, as determined by the impeller, substantially without shock in both extreme positions of adjustment and to discharge the liquid, in both extreme positions of adjustment, with an absolute velocity for the reception of the liquid at the entrance of the impeller blades substantially without shock, the turbine blades being constructed to substantially uniformly decelerate the liquid in the extreme position of adjustment for the high R. P. M. ratio.

4. In a hydraulic coupling, a driving member, a driven member, a housing forming a torus chamber surrounding the axis of the said members, an impeller on the driving member having fixed blades operating in the torus chamber for causing the liquid to flow in the torus chamber, a stator having fixed blades for receiving the liquid discharged from the impeller, a turbine on the driven member having blades for receiving the liquid discharged from the stator, means mounting the turbine blades for pivotal adjustment, each on a substantially radial axis, through a predetermined angle to provide a high R. P. M. ratio between the impeller and the turbine in one extreme position of adjustment and a low R. P. M. ratio in the other extreme position of adjustment, the blades of the turbine being constructed to substantially uniformly decelerate the liquid when adjusted in the extreme high R. P. M. ratio position.

5. In a hydraulic coupling, a housing forming a torus chamber extending around an axis of rotation, a driving member having an impeller with fixed blades operating in the torus chamber, a stator having fixed blades for receiving the liquid discharged by the impeller blades, a driven member having a turbine with blades positioned on the side of the stator blades opposite the impeller blades, means pivotally mounting the turbine blades on axes disposed substantially radially, means for adjusting the turbine blades on their axes through a predetermined range of movement for varying the effective R. P. M. ratio between the impeller and the turbine, the blades of the impeller and the turbine being formed and so coordinated that the entrance and exit velocities at the impeller blades is determined by the conditions for substantially shockless entrance to the turbine blades and for discharge from the turbine blades at substantially the original direction of impeller entrance velocity at the extreme positions of adjustment of the turbine blades.

6. In a hydraulic coupling, a driving member having an impeller, a driven member having a turbine, a housing providing a torus chamber extending around the axis of rotation of the members, the impeller having fixed blades operating in the torus chamber, the turbine having blades operating in the torus chamber, a stator having fixed blades positioned between the impeller and turbine blades, a pivot member having a substantially radial axis pivotally mounting each turbine blade, means for adjusting each turbine blade on its axis between predetermined extreme positions, the form of the turbine blades providing for substantially shockless entrance and axial discharge of the liquid at the two extreme positions of adjustment of the turbine blades, the impeller blades being formed and coordinated to conform to the turbine blade conditions and the stator blades being coordinated to transmit the liquid discharged from the impeller to the entrance of the turbine blades with substantially no change in the absolute velocity angle.

ERNEST E. WEMP.